United States Patent
Jain et al.

(10) Patent No.: US 12,524,009 B2
(45) Date of Patent: Jan. 13, 2026

(54) POSITIONING SYSTEM AND MOBILE OBJECT EQUIPPED THEREWITH

(71) Applicant: HONDA MOTOR CO., LTD., Tokyo (JP)

(72) Inventors: Aman Jain, Wako (JP); Kentaro Yamada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 303 days.

(21) Appl. No.: 18/121,191

(22) Filed: Mar. 14, 2023

(65) Prior Publication Data

US 2023/0305562 A1   Sep. 28, 2023

(30) Foreign Application Priority Data

Mar. 23, 2022   (JP) .................. 2022-047322

(51) Int. Cl.
  *G05D 1/02*   (2020.01)
  *G05D 1/00*   (2024.01)
  *G06V 40/10*  (2022.01)

(52) U.S. Cl.
  CPC ......... *G05D 1/0212* (2013.01); *G05D 1/0094* (2013.01); *G06V 40/10* (2022.01)

(58) Field of Classification Search
  None
  See application file for complete search history.

(56) References Cited

U.S. PATENT DOCUMENTS

| | | | |
|---|---|---|---|
| 2015/0199019 A1* | 7/2015 | Steers | B60K 35/80 |
| | | | 348/148 |
| 2019/0004618 A1* | 1/2019 | Tadros | G06F 3/012 |
| 2019/0102377 A1* | 4/2019 | Neuman | G05D 1/2285 |
| 2020/0026362 A1* | 1/2020 | Kim | G06F 3/013 |
| 2020/0310430 A1* | 10/2020 | Shoda | G05D 1/0212 |
| 2021/0090341 A1* | 3/2021 | Ravasz | G06V 40/193 |
| 2021/0216202 A1 | 7/2021 | Noguchi et al. | |

FOREIGN PATENT DOCUMENTS

JP   2021-109530 A   8/2021

* cited by examiner

*Primary Examiner* — Anne Marie Antonucci
*Assistant Examiner* — Kyle S Park
(74) *Attorney, Agent, or Firm* — WHDA, LLP

(57) ABSTRACT

A positioning system comprising a camera that captures an image is provided. The system identifies a destination position that is a three-dimensional position of a destination on a basis of the image including a person, and estimates three-dimensional positions of two key points of the person. In a case where an intersection between a line connecting the two key points and a ground is within a predetermined range from the person, the intersection is identified as the destination position. In a case where the intersection between the line connecting the two key points and the ground is not within the predetermined range from the person, a position of an object target existing within a predetermined distance from the line is identified as the destination position, from among object targets identified from the image.

19 Claims, 6 Drawing Sheets

POSITIONING SYSTEM AND MOBILE OBJECT EQUIPPED THEREWITH

CROSS-REFERENCE TO RELATED APPLICATION(S)

This application claims priority to and the benefit of Japanese Patent Application No. 2022-47322 filed on Mar. 23, 2022, the entire disclosure of which is incorporated herein by reference.

BACKGROUND OF THE INVENTION

Field of the Invention

The present invention relates to a positioning system for, for example, remotely controlling a vehicle and a mobile object such as a vehicle equipped with the positioning system.

Description of the Related Art

In recent years, an automated driving vehicle that travels in an automated manner while detecting an obstacle or the like has been developed. Usually, in the automated driving, a route toward a destination selected from a map is determined, and the vehicle moves along the determined route. There is also an automated driving function in which a vehicle is remotely controlled and moved by an operator outside the vehicle (for example, refer to Japanese Patent Laid-Open No. 2021-109530). In the technique disclosed in Japanese Patent Laid-Open No. 2021-109530, when a vehicle is to be moved toward a parking position, an operator gives instructions from a terminal device on whether to move or stop the vehicle.

Here, the parking position serving as a destination is identified from an obstacle and a white line detected by an external sensor provided in the vehicle. In this manner, a technique for moving a vehicle setting a position not selected from a map as a destination by means of an automated driving function has also been proposed.

However, in the technique disclosed in Japanese Patent Laid-Open No. 2021-109530, an operator outside a vehicle cannot designate a destination and move the vehicle toward the destination.

SUMMARY OF THE INVENTION

The present invention provides an image processing method that enables an operator outside a vehicle to designate a destination with a simple operation, a vehicle control device using the image processing method, and a vehicle.

The present invention has the following configuration. According to an aspect of the invention, provided is a positioning system comprising: at least one processor; at least one memory that stores at least one program; and a camera that captures an image, wherein the at least one program causes the at least one processor to perform identifying a destination position that is a three-dimensional position of a destination on a basis of the image, wherein the three-dimensional position is a position in a three-dimensional space with reference to a position and an image capturing direction of the camera, and wherein the identifying includes identifying a person from the image, and estimating three-dimensional positions of two key points of the person after the person is identified, in a case where an intersection between a line connecting the two key points and a ground is within a predetermined range from the person, identifying the intersection as the destination position, and in a case where the intersection between the line connecting the two key points and the ground is not within the predetermined range from the person, identifying, as the destination position, a position of an object target existing within a predetermined distance from the line, from among object targets identified from the image.

According to another aspect of the invention, provided is a mobile object comprising a positioning system, wherein the positioning system includes at least one processor, at least one memory that stores at least one program, and a camera that captures an image, wherein the at least one program causes the at least one processor to perform identifying a destination position that is a three-dimensional position of a destination on a basis of the image, wherein the three-dimensional position is a position in a three-dimensional space with reference to a position and an image capturing direction of the camera, and wherein the identifying includes identifying a person from the image, and estimating three-dimensional positions of two key points of the person after the person is identified, in a case where an intersection between a line connecting the two key points and a ground is within a predetermined range from the person, identifying the intersection as the destination position, and in a case where the intersection between the line connecting the two key points and the ground is not within the predetermined range from the person, identifying, as the destination position, a position of an object target existing within a predetermined distance from the line, from among object targets identified from the image.

According to the present invention, an operator outside a vehicle can designate a destination with a simple operation.

Further features of the present invention will become apparent from the following description of exemplary embodiments with reference to the attached drawings.

DESCRIPTION OF THE EMBODIMENTS

First Embodiment

Figure 1:
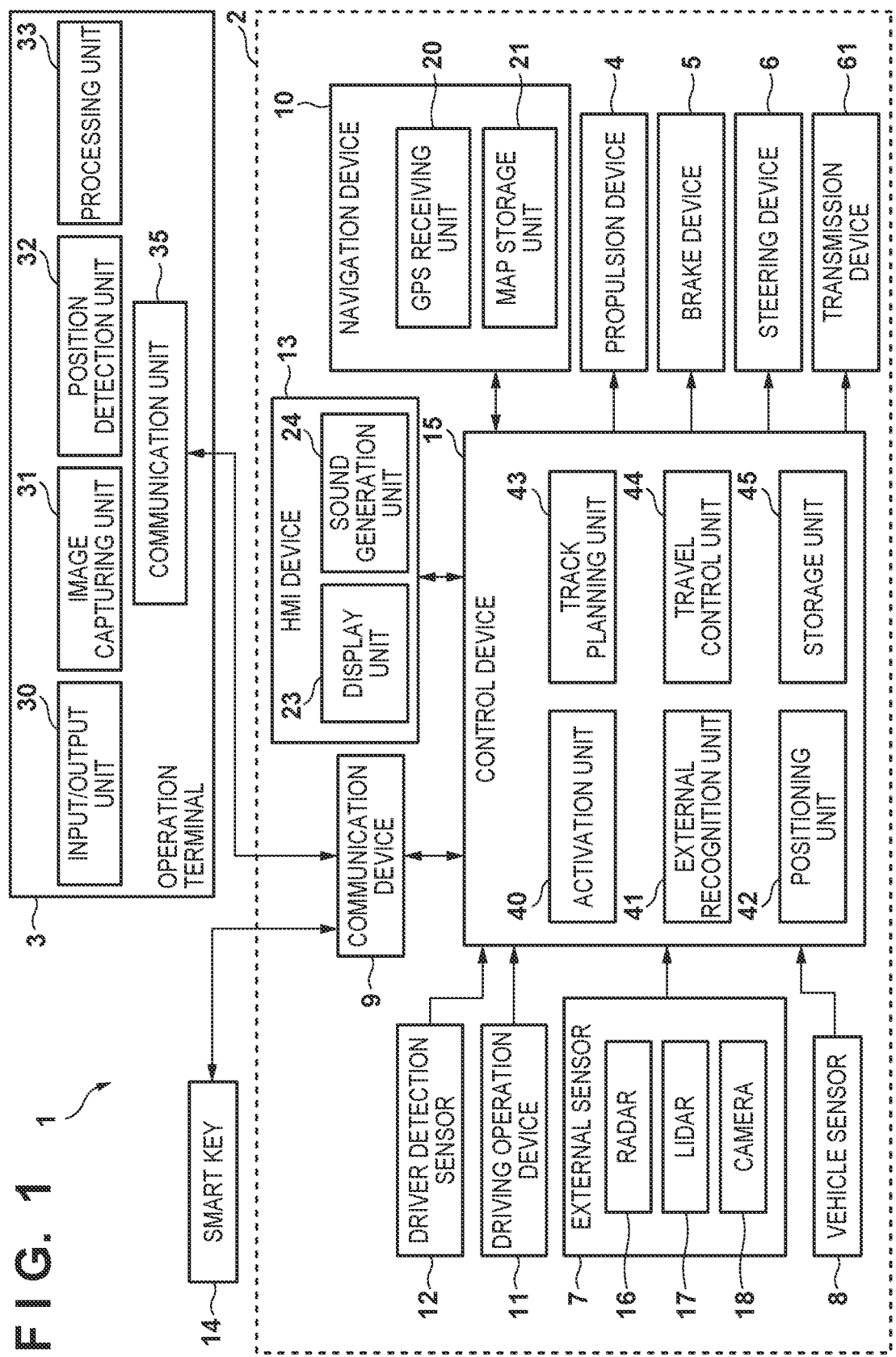
FIG. 1 is a block diagram illustrating a configuration for controlling an automated driving vehicle.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

System Configuration

First, a vehicle control system including an automated driving vehicle and an operation terminal device (also referred to as an operation terminal or a remote operation terminal) will be described. As illustrated in FIG. 1, a vehicle control system 1 includes a vehicle system 2 mounted on a vehicle and an operation terminal 3. The vehicle system 2 includes a propulsion device 4, a brake device 5, a steering device 6, a transmission device 61, an external sensor 7, a vehicle sensor 8, a communication device 9, a navigation device 10, a driving operation device 11, a driver detection sensor 12, an interface device (human machine interface device (HMI)) 13, a smart key 14, and a control device 15. The respective components of the vehicle system 2 are connected with one another to enable signal communication via an in-vehicle communication network such as a controller area network (CAN).

The propulsion device 4 is a device that applies a driving force to the vehicle, and includes, for example, a power source. The transmission device 61 is, for example, a continuously variable or step-type transmission, and changes the engine speed of the shaft on the driven side with respect to the engine speed of the shaft on the driving side. The power source includes at least one of an internal combustion engine such as a gasoline engine and a diesel engine, and an electric motor. The brake device 5 is a device that applies a braking force to the vehicle, and includes, for example, a brake caliper that presses a pad against a brake rotor and an electric cylinder that supplies hydraulic pressure to the brake caliper. The brake device 5 includes a parking brake device that restricts the rotation of the wheel by means of a wire cable. The steering device 6 is a device that changes the steering angle of the wheel, and includes, for example, a rack and pinion mechanism that steers the wheel and an electric motor that drives the rack and pinion mechanism. The propulsion device 4, the brake device 5, and the steering device 6 are controlled by the control device 15.

The external sensor 7 is a sensor that detects an object or the like around the vehicle. The external sensor 7 includes a radar 16, a light detection and ranging (LiDAR) 17, and a camera 18, and outputs a detection result to the control device 15.

The radar 16 is, for example, a millimeter-wave radar, which can detect an object around the vehicle through radio waves and measure a distance to an object. A plurality of radars 16 are provided on the outside of the vehicle, for example, one at the center of the front of the vehicle, one at each corner of the front, and one at each corner of the rear.

The LiDAR 17 can detect an object around the vehicle through light and measure a distance to an object. A plurality of LiDARs 17 is provided on the outside of the vehicle, for example, one at each corner of the front of the vehicle, one at the center of the rear, and one at each side of the rear.

The camera 18 is a device that captures an image of the surroundings of the vehicle, and is, for example, a digital camera using a solid-state imaging device such as a CCD and a CMOS. The camera 18 includes a front camera that captures an image of the front of the vehicle and a rear camera that captures an image of the rear. The camera 18 is provided in the vicinity of the door mirror installation location of the vehicle, and includes a pair of right and left door mirror cameras that capture images of the right and left side rear portions.

The vehicle sensor 8 includes a vehicle speed sensor that detects the speed of the vehicle, an acceleration sensor that detects acceleration, a yaw rate sensor that detects an angular velocity around a vertical axis, an orientation sensor that detects an orientation of the vehicle, and the like. The yaw rate sensor is, for example, a gyro sensor.

The communication device 9 mediates wireless communication between the control device 15 and a communication unit 35 of the operation terminal 3. That is, the control device 15 can communicate with the operation terminal 3 possessed by the user using a communication method such as infrared communication and Bluetooth (registered trademark) via the communication device 9.

The navigation device 10 is a device that acquires the current position of the vehicle and provides route guidance to a destination or the like, and includes a GPS receiving unit 20 and a map storage unit 21. The GPS receiving unit 20 identifies the position (latitude and longitude) of the vehicle on the basis of a signal received from an artificial satellite (positioning satellite). In the present example, the GPS is used as the GNSS, but another GNSS may be used. The map storage unit 21 includes a storage device such as a flash memory and a hard disk, and stores map information.

The driving operation device 11 is provided in the vehicle interior and receives an input operation that the user performs to control the vehicle. The driving operation device 11 includes, for example, a steering wheel, an accelerator pedal, a brake pedal, a parking brake device, a shift lever, and a push start switch (engine start button) as driving operation units. The push start switch receives an input operation for activating the vehicle in response to a driving operation from the user. The driving operation device 11 includes a sensor that detects an operation amount, and outputs a signal indicating the operation amount to the control device 15.

The driver detection sensor 12 is a sensor for detecting whether or not a person is seated on the driver's seat. The driver detection sensor 12 is, for example, a seating sensor provided on the seating surface of the driver's seat. The seating sensor may be a capacitive sensor or a membrane switch that is turned on when a person sits on the driver's seat. Alternatively, the driver detection sensor 12 may be an indoor camera that captures an image of the user seated on the driver's seat. In addition, the driver detection sensor 12 may be a sensor that acquires whether the tongue of the seat belt of the driver's seat is inserted in the buckle and detects that a person is seated on the driver's seat and wears the seat belt. The driver detection sensor 12 outputs a detection result to the control device 15.

The interface device 13 (HMI device) provides an interface (HMI) between the control device 15 and the user, notifies the user of various types of information by means of display and sound, and receives an input operation from the user. The interface device 13 includes a display unit 23 that includes liquid crystal, organic EL, or the like and functions as a touch panel capable of receiving an input operation from the user, and a sound generation unit 24 such as a buzzer and a loudspeaker.

The control device 15 is an electronic control device (ECU) that includes a CPU, a nonvolatile memory (ROM), a volatile memory (RAM), and the like. The control device 15 can execute various kinds of vehicle control by executing arithmetic processing based on a program by means of the CPU. The functions of at least some of the functional units of the control device 15 may be fulfilled by hardware such as an LSI, an ASIC, and an FPGA, or may be fulfilled by a combination of software and hardware.

The smart key 14 (FOB) is a wireless terminal that the user can carry around, and is configured to be able to communicate with the control device 15 from the outside of the vehicle via the communication device 9. The smart key 14 includes a button for the user to perform input, and the user can lock the door, unlock the door, activate the vehicle, and the like by operating the button of the smart key 14.

The operation terminal 3 is a wireless terminal that the user can carry around, and can communicate with the control device 15 from the outside of the vehicle via the communication device 9. In the present embodiment, the operation terminal 3 is, for example, a portable information processing device such as a smartphone. A predetermined application is installed in the operation terminal 3 in advance to enable the operation terminal 3 to communicate with the control device 15. Information for identifying the operation terminal 3 (for example, a terminal ID including a predetermined numerical value, character string, or the like for identifying each operation terminal) is set in the operation terminal 3, and the control device 15 can authenticate the operation terminal 3 on the basis of the terminal ID.

As illustrated in FIG. 1, the operation terminal 3 includes an input/output unit 30, an image capturing unit 31, a position detection unit 32, a processing unit 33, and a communication unit 35 as functional components.

The input/output unit 30 presents information to the user who operates the operation terminal 3 and receives an input from the user who operates the operation terminal 3. The input/output unit 30 functions as, for example, a touch panel, and when receiving an input from the user, the input/output unit 30 outputs a signal corresponding to the input to the processing unit 33. The input/output unit 30 further includes a sound input/output device and a vibration generation device, which are not illustrated. For example, the sound input/output device can output a digital signal as a sound and convert an input sound into a digital signal. The vibration generation device generates vibration together with sound output or instead of sound output to vibrate the housing of the operation terminal 3.

The image capturing unit 31 can capture an image (a still image or a moving image) in accordance with an image capturing mode set from the input/output unit 30, and the image capturing unit 31 is, for example, a digital camera including a CMOS or the like. The processing unit 33 can acquire a feature of an image obtained by capturing an image of the user who operates the operation terminal 3 and performing predetermined image processing on the image, and perform authentication of the user by comparing the feature with a feature of a face image of the user registered in advance.

The position detection unit 32 includes a sensor capable of acquiring positional information of the operation terminal 3. The position detection unit 32 can acquire the position of the operation terminal 3, for example, by receiving a signal from a geodetic satellite (GPS satellite). Also, the position detection unit 32 communicates with the control device 15 via the communication device 9 to enable the position detection unit 32 to acquire positional information including the relative position of the operation terminal 3 with respect to the vehicle. The position detection unit 32 outputs the acquired positional information to the processing unit 33.

The processing unit 33 transmits the terminal ID set in the operation terminal 3, the signal from the input/output unit 30, and the positional information acquired by the position detection unit 32 to the control device 15. In addition, when receiving a signal from the control device 15, the processing unit 33 processes the signal and causes the input/output unit 30 to present information to the user who operates the operation terminal 3. The information is presented, for example, by displaying the information on the input/output unit 30. The communication unit 35 performs wireless or wired communication with the communication device 9. In the present example, it is assumed that wireless communication is performed.

The control device 15 can drive the vehicle on the basis of a signal from the operation terminal 3. The control device 15 can also move the vehicle to a predetermined location to perform remote parking. In order to control the vehicle, the control device 15 includes at least an activation unit 40, an external recognition unit 41, a positioning unit 42, a track planning unit 43, a travel control unit 44, and a storage unit 45.

The activation unit 40 authenticates the smart key 14 on the basis of a signal from the push start switch, and determines whether the smart key 14 is in the vehicle. When the smart key 14 is authenticated and the smart key 14 is in the vehicle, the activation unit 40 starts driving of the propulsion device 4. Also, when receiving from the operation terminal 3 a signal commanding activation, the activation unit 40 authenticates the operation terminal 3, and starts driving of the vehicle when the operation terminal 3 is authenticated. When starting driving of the vehicle, the activation unit 40 turns on an ignition device (ignition) in a case where the propulsion device 4 includes an internal combustion engine.

The external recognition unit 41 recognizes, for example, an obstacle existing around the vehicle, such as a parked vehicle and a wall, on the basis of the detection result of the external sensor 7, and acquires information regarding the position, the size, and the like of the obstacle. The external recognition unit 41 can also analyze the image acquired by the camera 18 by means of an image analysis method such as pattern matching, and can acquire the presence or absence of an obstacle and the size thereof. The external recognition unit 41 can further calculate the distance to the obstacle using the signals from the radar 16 and the LiDAR 17 and acquire the position of the obstacle.

The positioning unit 42 can detect the position of the vehicle on the basis of a signal from the GPS receiving unit 20 of the navigation device 10. The positioning unit 42 can also acquire the vehicle speed and the yaw rate from the vehicle sensor 8 in addition to the signal from the GPS receiving unit 20, and identify the position and the posture of the vehicle using so-called inertial navigation.

The external recognition unit 41 can analyze a detection result of the external sensor 7, more specifically, an image captured by the camera 18 by means of an image analysis method such as pattern matching, and acquire, for example, a position of a white line drawn on a road surface of a parking lot or the like.

The travel control unit 44 controls the propulsion device 4, the brake device 5, and the steering device 6 on the basis of a command to control travel from the track planning unit 43 to cause the vehicle to travel.

The storage unit 37 includes a RAM or the like, and stores information required for processing of the track planning unit 43 and the travel control unit 44.

When there is an input from the user into the HMI device 13 or the operation terminal 3, the track planning unit 43 calculates a track serving as a travel route of the vehicle as necessary, and outputs a command to control travel to the travel control unit 44.

The track planning unit 43 performs parking assist processing when there is an input corresponding to a request for remote-controlled parking assist (remote parking assist) from the user after the vehicle is stopped.

Destination Setting

In the invention according to the present embodiment, the positioning unit 42 further has a function of setting a destination designated by the operator on the basis of an image captured by the camera 18. Here, it is assumed that the camera that captures the image of the front is a monocular camera, is secured to the vehicle body, and has a fixed focal length. The positioning unit 42 can identify (or estimate) a point indicated by the operator on the basis of the gesture of the operator included in the image captured by the camera 18 and set the point as the destination. Then, the control device 15 controls driving, braking, and steering toward the set destination to cause the vehicle to travel. The operator may give to the vehicle the trigger for destination setting and traveling from, for example, the operation terminal 3 via a predetermined application. This system may be referred to as a positioning system because it a destination is identified.

Note that, in the following description, the camera 18 is a monocular camera. Also, the camera 18 faces to the front (that is, in the forward direction) for convenience, and the camera 18 may face in either direction as long as the target position is included in the visual field. For example, in a case where the position of the destination (referred to as a destination position) is identified with reference to the position of the camera and the direction of the optical axis on the basis of the image, transform into a predetermined coordinate system can be performed by projective transform or the like.

Figure 2A:
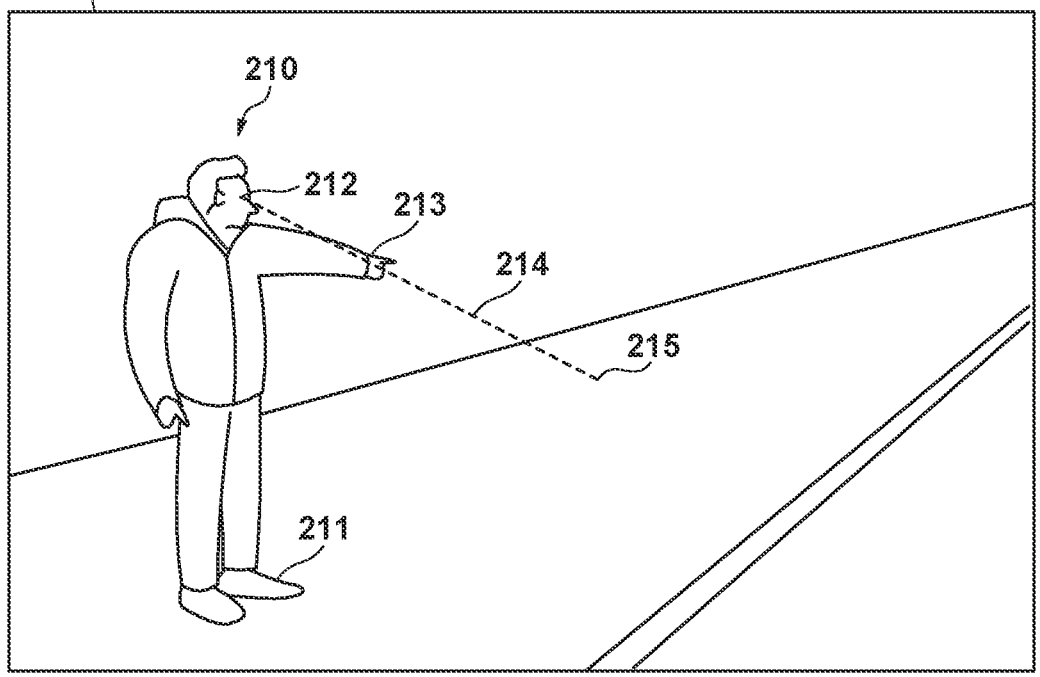
FIGS. 2A and 2B are diagrams each illustrating an example of a gesture used when an operator sets a destination.
Figure 2B:
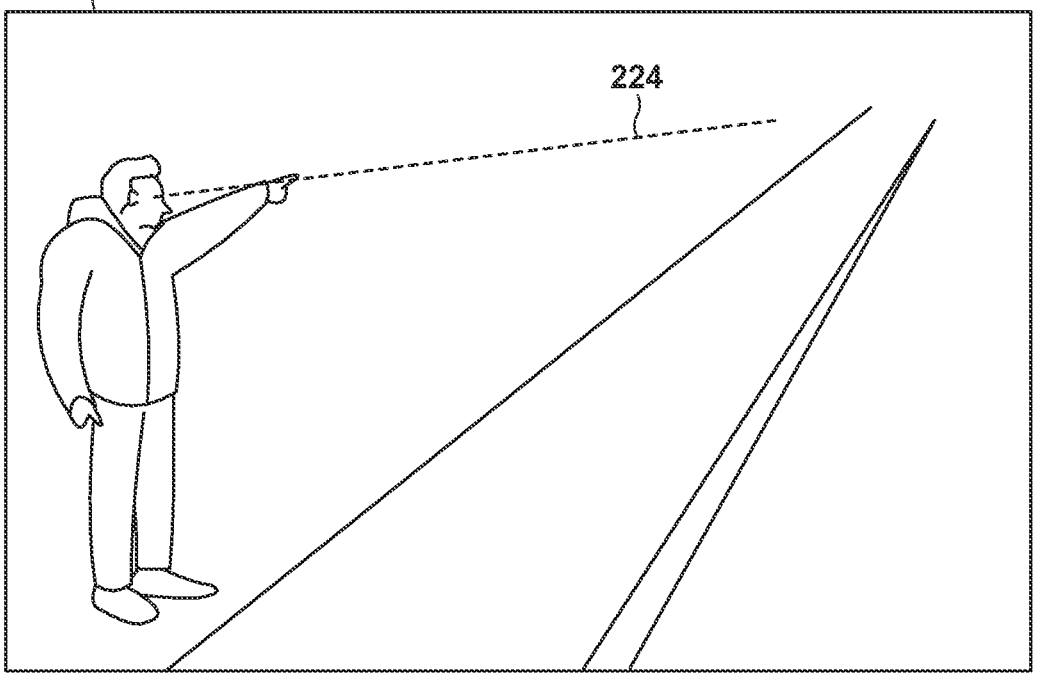

FIGS. 2A and 2B illustrate an example of an image 200 obtained by capturing a state in which the operator indicates a destination. In FIG. 2A, an operator 210 indicates a destination at a short distance. A ground contact portion 211 is a position of the foot of the operator 210, and an eye 212 is located substantially immediately above the ground contact portion. The eye can be either the left or right eye of a person. The operator 210 gives indication by extending the arm, and the destination is an intersection 215 where an indication line 214, obtained by extending a line connecting two key points, in this example, the eye 212 and a wrist 213, in the wrist direction, and the ground surface intersect. Note that the key points may be selected in any manner, but it is preferable to set the eye position as one point because the operator can accurately designate the position through the line of sight. Also, the other point is preferably a position that can easily be identified from the image, such as the fingertip and the tip end or the center of the fist, instead of the wrist. Further, when the operator indicates a destination, an eye part of the face may not be able to be captured from the camera 18 because the face faces in the direction of the destination. In such a case, the position of the eye may be estimated and identified. In a case where the direction of the face can be identified, the position of the eye in the captured image can be estimated. Note that the estimation of the position of the eye may be performed using a machine learning model.

In FIG. 2B, the operator 210 indicates a destination at a long distance. The arm is raised higher than in FIG. 2A, and an indication line 224 indicate a position distant from the operator 210. In such a case, a slight movement of the arm results in a large movement of the intersection 215, which lowers the accuracy of the indicated destination. Further, depending on the height of the wrist position, the indication line 224 may not intersect with the ground surface, and the intersection 215 may not be identified.

Figure 3:
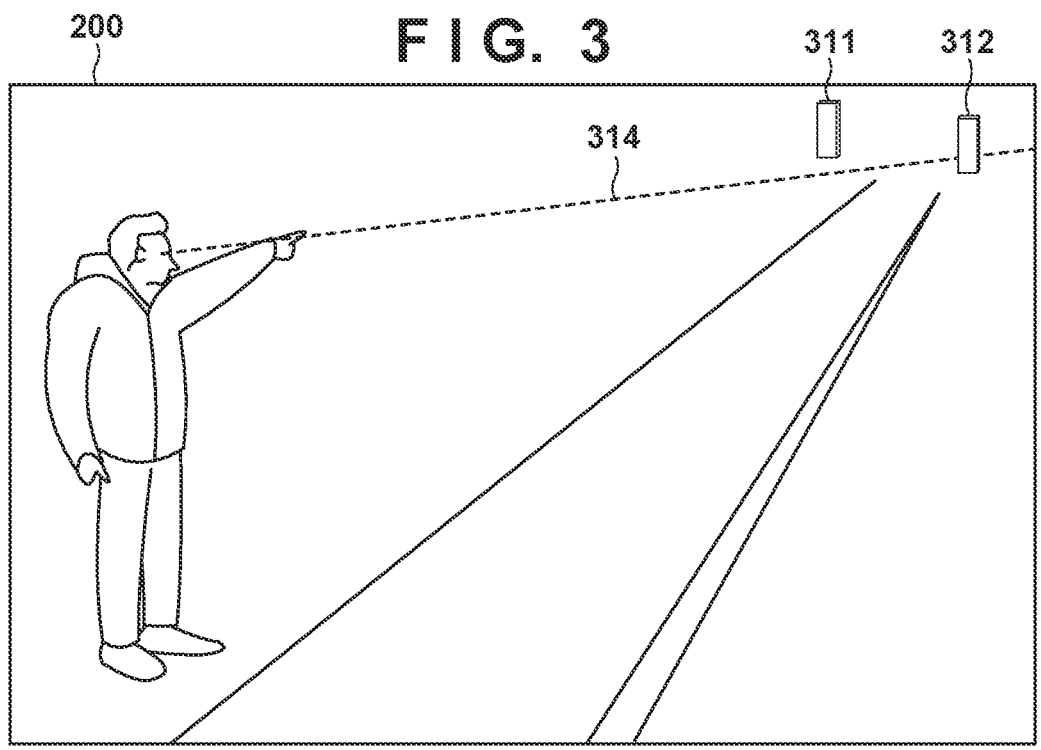
FIG. 3 is a diagram illustrating an example of a gesture used when the operator sets a destination at a long distance.

Therefore, in a case where the destination is distant, as illustrated in FIG. 3, a facility or an object target such as a vending machine, a mailbox, and a building in the vicinity of the indication line 314 is identified from the image. Then, an object target closest to the indication line 314 is identified from among the object targets identified from the image, and the identified object target is set as the destination. Note that, as for the determination on whether the distance is a long distance, for example, in a case where the distance from the ground contact portion 211 of the operator to the intersection 215 exceeds a predetermined threshold value, or where the intersection 215 cannot be identified, the distance may be determined as a long distance. As the predetermined threshold value, a specific value, for example, about 20 to 30 meters may be set, but this is of course merely an example.

Figure 4:
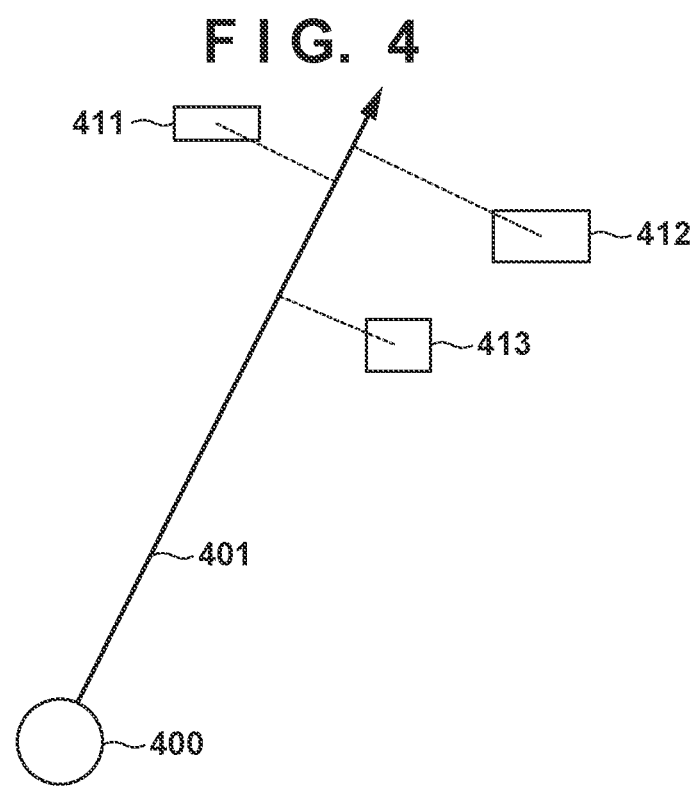
FIG. 4 is a schematic diagram illustrating an example of a method for setting a destination at a long distance.

FIG. 4 illustrates an example of identifying an object target as a destination in a case where a destination at a long distance is set. In this case, the indication line 224 is not identified in three dimensions, but may be treated as a line 400 projected on the ground surface. An object target closest to the projected indication line 400 is identified from among object targets 411, 412, and 413. The distance in this case may be a distance from the position of the object target to the indication line 400 measured in a direction orthogonal to the indication line 400 (that is, the shortest distance to the indication line 400). In addition, the position of the object target is the ground contact position thereof, and in a case where the object target has a certain area, the position of the object target may be the center of the area or the like. Alternatively, in a case where the object target has a certain area, the distance from the indication line 400 to the closest end point among a plurality of end points of the area may be set as the distance between the indication line 400 and the object target.

In the example in FIG. 4, the object target 413 is identified as the object target closest to the indication line 400, and the position of the object target 413 is the destination. Here, in a case where the destination overlaps with the position of the object target, the vehicle may be driven to avoid the object target by means of control using automated driving.

Destination Setting Processing

FIGS. 5 and 6A to 6C illustrate procedures for destination setting processing performed by the control device 15, particularly the positioning unit 42. As described above, since the function of the control device 15 is fulfilled as the CPU executes a program stored in the memory, the procedures of FIGS. 5 and 6A to 6C may also be executed by the CPU (or the processor).

Figure 5:
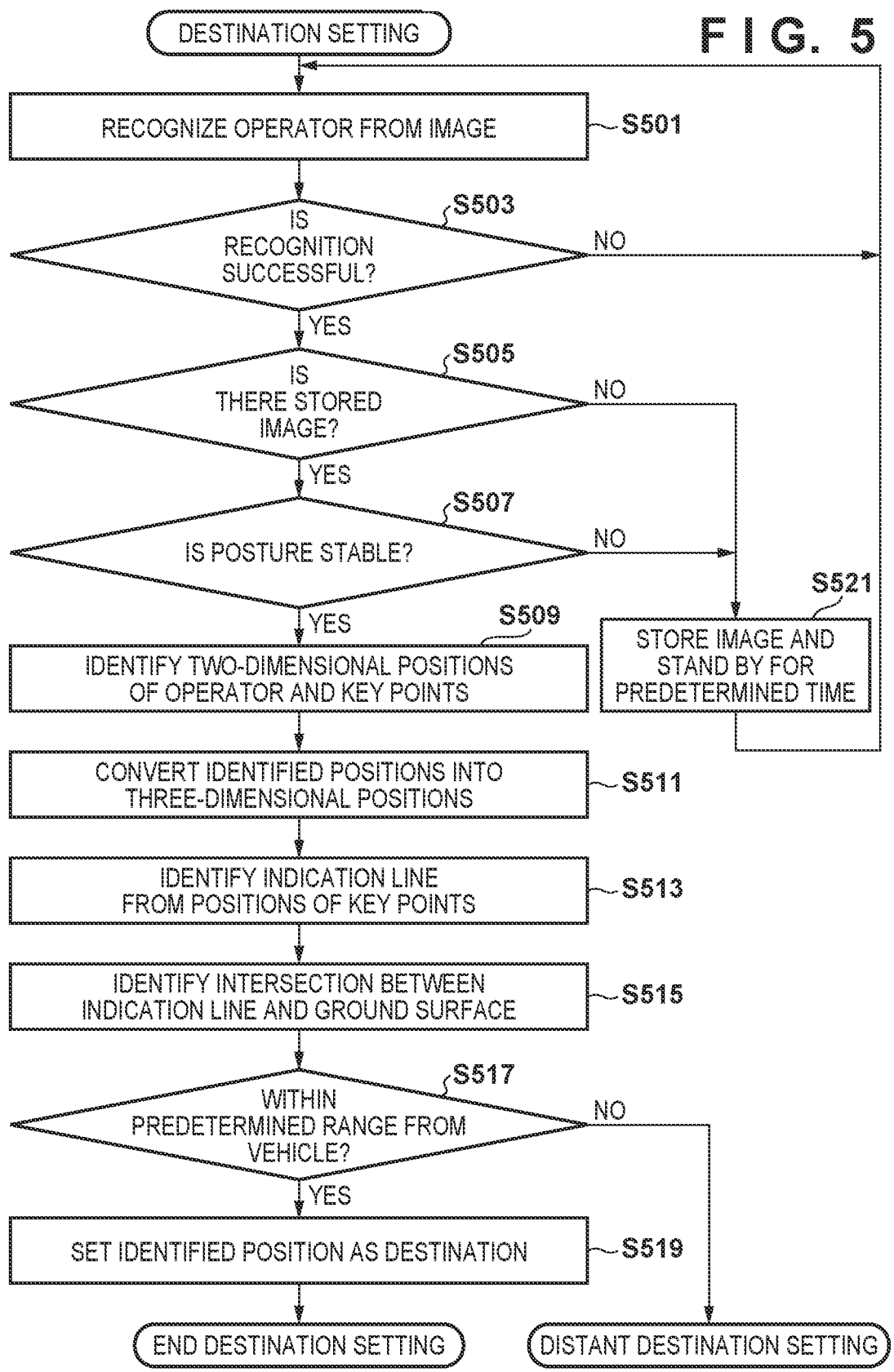
FIG. 5 is a flowchart of processing for setting a destination.

For example, when the operator gives a command to set a destination to the control device 15 of the vehicle from the operation terminal 3 via the communication device 9, the procedure of FIG. 5 is triggered by the command. The operator may give a command from an operation panel or the like provided in the vehicle body. Note that the vehicle is in a power-on state, and power is supplied to the control device 15.

First, the operator is recognized based on the image captured by the camera 18 (S501). Not only the person who is the operator, but also an object target such as a vending machine, a mailbox, a utility pole, and a building within the image capturing range may also be recognized. The recognition of the operator may be performed by determining the similarity between the feature amount of the captured object and the feature amount corresponding to a person, or by using a pre-trained machine learning model.

In a case where the recognition of the operator has been attempted, it is determined whether the recognition has been successful (S503). In a case where a person can be recognized, it may be determined that the recognition is successful. In a case where no person can be recognized, it is determined that the recognition fails even in a case where another object can be recognized. Further, at this time, the face of the person may be recognized, and it may be determined whether the face of the person matches the pre-stored face of a specific person who has been given the authority to operate the vehicle, and in a case where the face does not match the pre-stored face, it may be determined that the recognition has been failed. In a case where the recognition fails, step S501 is repeated for a new image captured after the target image.

In a case where the recognition of the operator is successful, it is determined whether there is a stored image captured a predetermined time before the image designated as the currently processed target (S505). Since the camera 18 is capturing a moving image, and the processed target image is a frame constituting the moving image, the stored image may be a frame a predetermined number of pieces before the processed target image. In a case where it is determined that there is a stored image, it is determined whether the posture of the operator is stable (S507). The destination cannot correctly be identified during the operation in which the operator indicates the destination. Therefore, in a case where it is determined that the posture is not stable, the target image is stored, standby is performed for a predetermined time (S521), and the processing is repeated from step S501 for a newly acquired image. In a case where it is determined in step S505 that there is no stored image as well, there is no material for determining the stability of the posture, and thus, the processing branches to step S521.

In step S507, the image of the operator included in the stored image is compared with the image of the operator included in the currently processed target image to determine whether the posture is stable. For example, the misalignment amount in terms of the person included in the two images may be derived, and it may be determined that the posture is stable in a case where the misalignment amount does not exceed a predetermined threshold value. For example, in a case where the ratio of the area of the person included in the processed target image to the area of the person obtained by combining the persons included in the two images is within a predetermined value, it may be determined that the misalignment amount is within the predetermined threshold value, and that the posture is stable.

In a case where it is determined that the posture of the operator is stable, the two-dimensional positions of the operator and the key points are identified (S509). The position of the operator may be the ground contact point of the operator, that is, the position of the foot. The two-dimensional position is a position on the image.

Subsequently, the two-dimensional positions of the identified key points are converted into three-dimensional positions (S511). The three-dimensional position is a position obtained by expressing in a predetermined coordinate system a position in a three-dimensional space where each of the operator and the key points exists. This conversion processing will be described with reference to FIGS. 7A and 7B, but a commonly used method may be used. After the positions of the two key points in the three-dimensional space are identified, an indication line passing through the positions of the key points is identified (S513). Further, an intersection between the indication line and the ground surface is identified (S515).

Subsequently, it is determined whether the intersection identified in step S513 is within a predetermined range from the vehicle (S517). It may be determined whether the intersection is within a predetermined range from the operator, not from the vehicle. In a case where the intersection cannot be identified, it may be determined that the intersection is not within the predetermined range. In a case where it is determined that the intersection is within the predetermined range, the position of the identified intersection is set as the destination (S519). On the other hand, in a case where it is determined that the intersection is not within the predetermined range, the processing branches to a distant destination setting procedure illustrated in FIG. 6A.

Distant Destination Setting Procedure

Figure 6A:
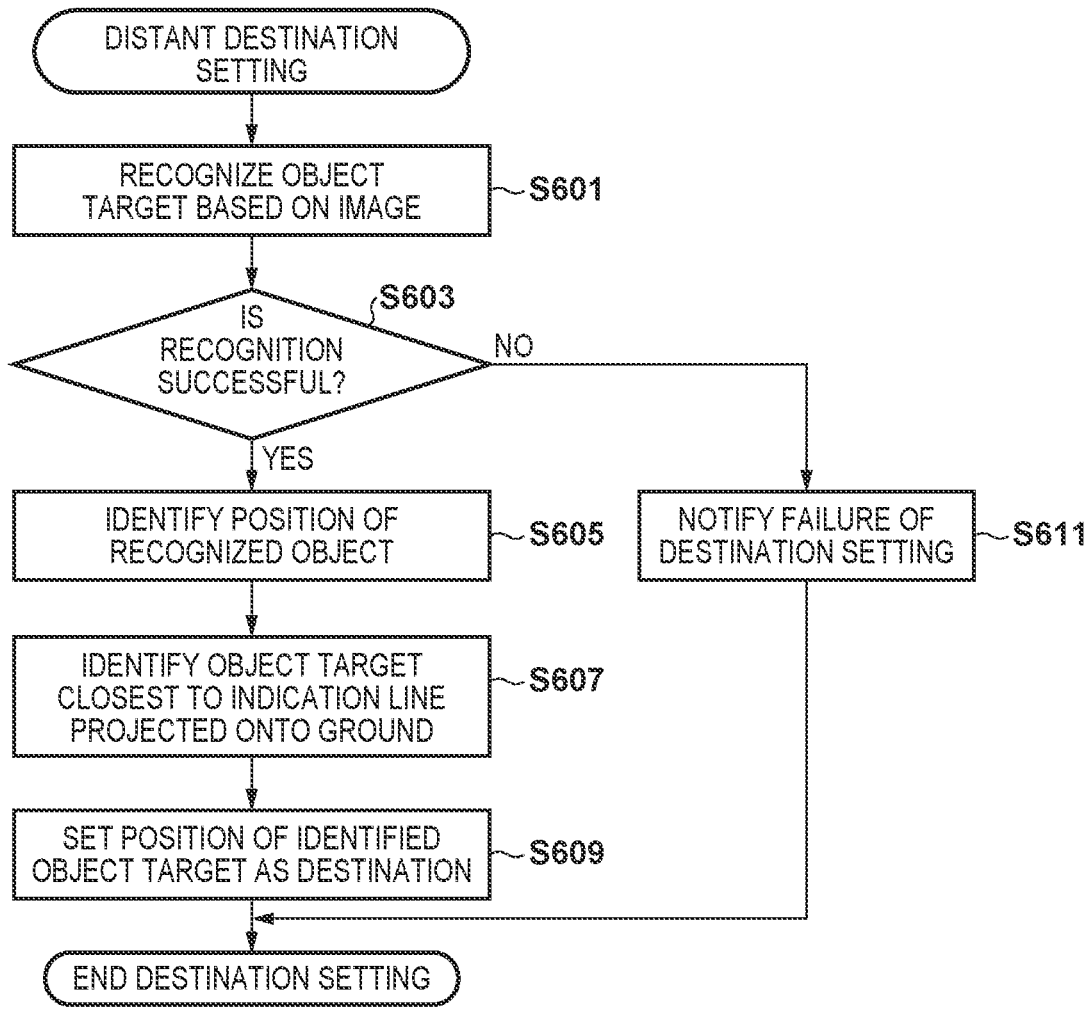
FIGS. 6A, 6B, and 6C are flowcharts of processing for setting a destination.
Figure 6B:
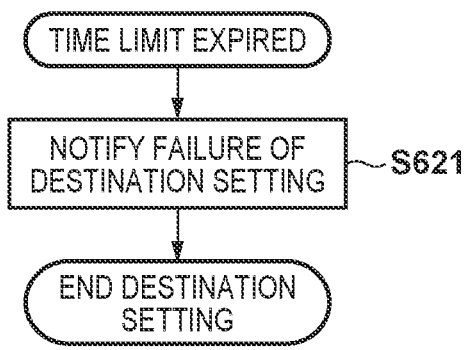

In FIG. 6A, the positioning unit 42 first recognizes an object target other than a person based on a target image (S601). For this recognition as well, pattern matching or a machine learning model may be used. Subsequently, it is determined whether the recognition has been successful (S603). In a case where at least one object target can be recognized, it may be determined that the recognition is successful. In a case where the recognition fails, the setting of the destination by means of the gesture is regarded as having failed, and the operator is notified of the failure (S611). The notification may be provided, for example, by a message addressed to the operation terminal 3, or by blinking the lamp of the vehicle, generating a warning sound, or the like.

In a case where it is determined that the recognition is successful, the position of the recognized object target is identified (S605). The position may be identified by converting the two-dimensional position identified on the image into the three-dimensional position as in steps S509 to S511 in FIG. 5, but these processes are collectively performed here. Note that, in the present embodiment, although the position is referred to as the three-dimensional position, it is assumed that every object target is on the ground surface, and the value in the height direction may thus be a constant corresponding to the height of the ground surface. Note that, in step S605, only an object target within a range of a predetermined distance from the vehicle may be identified. This can prevent an object target that is far away and will not be an indication target from being erroneously set as a destination.

After the three-dimensional position of the object target is identified, the position of the object target and the indication line identified in step S513 are projected onto the ground surface, and an object target within a predetermined distance from the projected indication line, for example, the closest object target, is identified (S607). In a case where there are a plurality of object targets closest to the projected indication line, one object target, for example, an object target closest to the operator (or the vehicle), may be selected from the plurality of object targets.

Finally, the position of the identified object target is set as the destination (S609). According to the above procedure, not only a destination close to the operator but also a destination distant from the operator can easily be indicated with a gesture. In addition, in a case where the operator knows that a distant destination is to be identified in this way, the operator will indicate a distant object target. Thus, it is possible to indicate even a distant destination with high accuracy.

Even in a state where the operator has left the destination setting operation suspended, it is not desirable for the vehicle to stand by for the destination setting. Therefore, a time limit may be set, and in a case where the destination is not set even after the time limit has elapsed, a failure may be notified as illustrated in step S621 in FIG. 6B. This notification may be similar to that in step S611. Note that the start of the time limit is, for example, a time when the operator notifies the control device 15 that the destination is to be set, and for example, a timer in which the time limit is set may be activated at the start of the processing of FIG. 5.

Figure 6C:
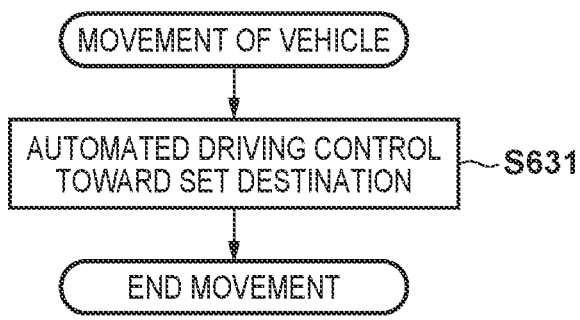

In order to move the vehicle to the destination set in the above manner, automated driving control toward the set destination is performed as illustrated in step S631 of FIG. 6C. FIG. 6C may be executed immediately when the setting of the destination is completed in FIG. 5 or FIG. 6A, or may be triggered by a signal of the operator.

Figure 7A:
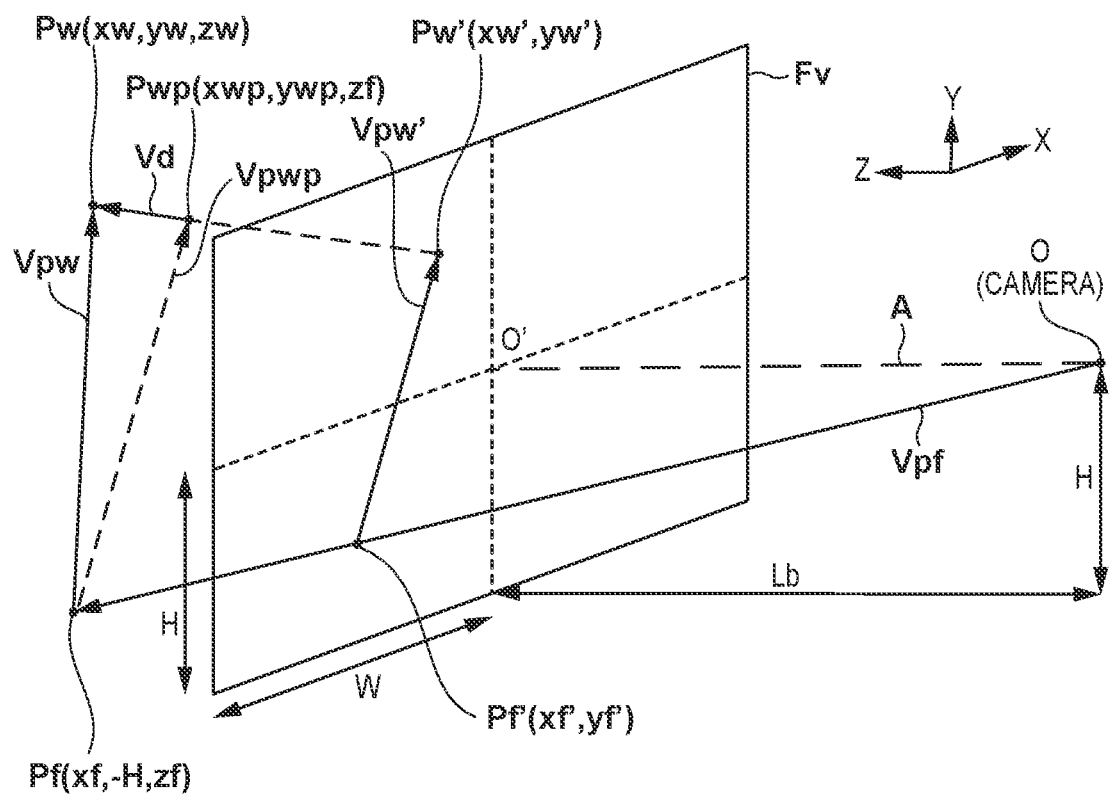
FIGS. 7A and 7B are schematic diagrams illustrating an example of identifying three-dimensional coordinates from an image.
Figure 7B:
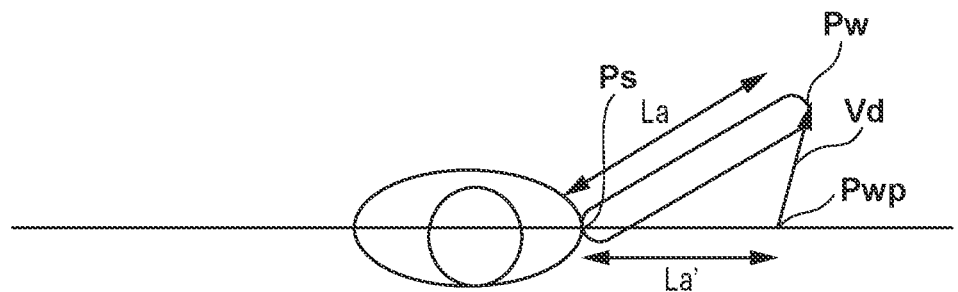

Identification of Two-Dimensional Position and Conversion to Three-Dimensional Position A specific example of the processing in steps S509 and S511 is illustrated in FIGS. 7A and 7B. The camera 18 is secured to the vehicle, and its position is a height H. In addition, for simplification of description, it is assumed that the camera is attached so that the optical axis thereof may be parallel to the ground surface. FIG. 7A illustrates an orthogonal coordinate system in which the position of the camera is the origin, the height direction is the Y axis, the direction of an optical axis A is the Z axis, and the direction orthogonal thereto is the X axis. The direction of the X axis may be referred to as a width, the direction of the Y axis may be referred to as a height, and the direction of the Z axis may be referred to as a depth.

Furthermore, a virtual frame Fv is assumed. The virtual frame Fv is obtained by enlarging the image so that the optical axis of the camera is orthogonal to the virtual frame Fv at its center O', and the lower end of the virtual frame Fv is at a position on the ground surface corresponding to the lower end of the angle of view in the height direction of the camera. Assuming that the distance in the Z direction from the origin O to the virtual frame Fv is Lb, the distance Lb is determined by the direction of the optical axis and the angle of view. However, it is also possible to identify a position appearing at the lower end of the image and actually measure the distance from the position to the camera position. That is, the distance Lb is a known value. Also, in FIG. 7A, since the optical axis is parallel to the ground surface, the height of the virtual frame Fv is 2H. The length in the virtual frame Fv and the length in the captured image are in a proportional relationship, and a proportional constant of the virtual frame Fv with respect to the actual image frame is defined as Cf. The proportional constant, that is, the enlargement ratio Cf may be, for example, a constant indicating the distance of the virtual frame Fv corresponding to one pixel in the actual image frame. In that case, in a case where the pixel densities in the vertical and horizontal directions of the image frame are different from each other, the enlargement ratio may be set for each of the vertical and horizontal directions.

In FIG. 7A, the operator stands at aground contact point Pf and indicates a destination. That is, the ground contact point Pf is the position of the foot of the operator. The wrist is at a wrist position Pw. Here, the identification of the position of the wrist will be described as an example, but the identification of the position of the eye can be performed in a similar manner to that of the wrist, and the identification of another part set as a key point can also be performed in the similar manner. At this time, a vector Vpf from the origin O, which is the camera position, to the ground contact point Pf, is to be considered. Since the ground contact point Pf is the ground surface, a height yf thereof is −H, and coordinates thereof can be expressed as (xf, −H, zf). This value is also the vector Vpf itself.

The ground contact point Pf is projected onto a point Pf on the virtual frame Fv. The position of the point on the image in the height direction can be associated with the position in the actual three-dimensional space in the direction of the Z axis on the assumption that the point is on the ground surface (ground) of the actual three-dimensional space. That is, the image height in the image can be converted into the position in the depth direction. The position of the point Pf on the virtual frame Fv is expressed as coordinates (xf, yf) with the origin O'. The coordinates xf', yf' can be identified from the position in the actual image and the proportional constant Cf. On the assumption that the optical axis A is parallel to the ground surface, Lb:yf'=zf:H. Thus, zf=Lb·H/yf'.

As for xf,

Lb:xf'=zf:xf. Thus, xf=xf·zf/Lb=H·xf'/yf'.

In this way, the position of the ground contact point Pf can be determined. Subsequently, the wrist position Pw is to be identified. The coordinates of the position Pw are (xw, yw, zw). The position of a point Pw' obtained by projecting the position Pw onto the virtual frame Fv is expressed as (xw', yw'). Considering a vector Vpw' from the point Pf to the point Pw', this vector Vpw' is obtained by projecting a vector Vpw from the point Pf to the point Pw onto the virtual frame Fv. Since the component in the depth direction cannot be identified from the vector Vpw', which can be observed on the virtual frame Fv, the vector Vpw cannot directly be identified. However, it is possible to identify a vector Vpwp obtained by projecting the vector Vpw onto a plane parallel to the virtual frame Fv and including the point Pf.

To do so, the same method as the method of determining the x component of the point Pf may be used. That is, x and y components of an end point Pwp (xwp, ywp, zf) of the vector Vpwp are xwp=xw'·zf/Lb=H·xw'/yf, and ywp=yw'·zf/Lb=H·yw'/yf.

Assuming that the position of the operator's eye in the three-dimensional space is the same as the ground contact point Pf, that is, the standing position, in the direction of the Z axis, the position can be identified from the position of the eye in the image in the same manner as the point Pwp (xwp, ywp, zf). However, for the position of the wrist, it is necessary to consider the displacement in the depth direction. In FIG. 7A, this displacement in the depth direction is expressed as a vector Vd. The vector Vd is a vector along a line that projects the wrist position Pw onto the virtual frame Fv, and does not appear in the virtual frame Fv.

Therefore, as illustrated in FIG. 7B, the vector Vd is estimated using an estimated arm length La. The position of the vector Vd in the three-dimensional space can be identified in the same manner as the point Pwp by identifying the ground contact point Pf of the operator in the above-described manner and identifying the position of the top of the head of the operator in the image. If two points, the ground contact point Pf and the point of the top of the head, can be identified, the apparent body height on the virtual frame Fv can be identified. On the assumption that the optical axis A is parallel to the ground surface, by multiplying the apparent body height by zf/Lb, the actual body height of the operator at the distance zf (=Lb·H/yf) from the origin O can be estimated. Furthermore, the control device 15 stores in advance the ratio of the length of the arm (for example, from the joint to the wrist) to the body height, whereby the arm length La can be estimated. The vector Vd can be estimated from the value La. The method is as follows.

As in FIG. 7A, the point Pwp and the vector Vpwp to the point Pwp are identified. In the same manner, a position Ps (refer to FIG. 7B) of the joint of the arm can be identified, and a vector Vps to the position Ps can be identified. Vpwp−Vps+Vd is a vector from the shoulder position Ps to the wrist position Pw, and |Vpwp−Vps+Vd|=La. Here, both Vpwp and Vd are vectors in the visual line direction, and Vd=k·Vpwp (k is a scalar constant). Thus,

|(k+1)·Vpwp−Vps|=La.

Since components other than the constant k in the above equation are known, the constant k can be determined, and thus the vector Vd can be determined. In this manner, the three-dimensional position of the wrist in the image can be estimated by shifting the position of the wrist in the image to a position corresponding to the length of the arm based on the estimated body height of the operator. However, the procedure for determining the constant k includes extraction of square root, and thus, the number of values is not one, but two values are obtained.

Therefore, in the present embodiment, it is determined which value is to be used on the basis of in the recognition result of the operator's eye, that is, the face direction. For example, in a case where the eye cannot be recognized based on the face image of the operator, that is, in a case where the face of the operator does not face in the direction of the camera, the higher value is selected as the constant k. Conversely, in a case where the eye can be recognized based on the face image, that is, in a case where the face of the operator faces in the direction of the camera, the lower value is selected as the constant k. By doing so, an appropriate position can be set as the destination in accordance with the operation of the destination indication by the operator. Note that, for the recognition of the eye, a pre-trained machine learning model may be used.

By identifying the vector Vd in the above-described manner, the vector Vpw and the wrist position Pw can be identified by Vpw=Vpwp+Vd. Since the position of the eye has already been identified, it is possible to identify the indication line obtained as the operator has indicated the destination on the basis of the positions of the two determined key points.

Another Example of Method for Determining Vector Vd

The vector Vd can also be determined in a simpler manner. Since the vector Vd is considered to be small in the magnitude, the vector Vd can be determined from the actual length La and an apparent length La' of the arm by assuming that the vector Vd is approximately orthogonal to the virtual frame Fv. In this case, the magnitude |Vd| of the vector Vd, La, and La' have a relationship of $La^2=La'^2+|Vd|^2$. That is, $|Vd|=\sqrt{(La^2-La'^2)}$. If both the x and y components are 0, the z component zvd of Vd may be zvd=|Vd| or −|Vd|. From the vector Vd identified in this manner as well, the vector Vpw and the wrist position Pw can be identified by Vpw=Vpwp+Vd. In this method as well, since the sign of zvd may be either positive or negative, Vd cannot uniquely be determined. Therefore, as described above, for example, the sign of the value of z may be negative in a case where the eye of the operator can be recognized, and the sign of the value of z may be positive in a case where the eye cannot be recognized.

Modifications

Note that, in FIG. 7A, the example in which the coordinates of the optical system and the coordinates of the ground are in a parallel movement relationship has been described. However, in a case where a depression angle or an elevation angle is provided in the camera, it is necessary to perform further coordinate conversion by means of projective transform or the like in consideration of the inclination of the optical axis.

However, even this case is not essentially different from the case described in FIG. 7A.

In steps S507 and S521 in FIG. 5, it is determined that the posture is stable, but the destination may be identified from an image captured in a state where the posture is stable. To do so, for example, the operator sends a signal to the control device 15 in a posture indicating the destination, and the signal triggers the positioning unit 42 to acquire a target image. By doing so, since the operator is indicating the destination in the acquired image, it is not particularly necessary to stand by for the stable posture. The signal may be, for example, touching a predetermined button displayed on an application being executed on the operation terminal, generating a specific sound, or the like. In the latter case, when the specific sound is recognized by the operation terminal, a signal indicating that the destination may be identified is transmitted to the control device 15.

As described above, according to the present embodiment and modifications, an operator outside a vehicle can designate a destination with a simple operation. Then, the vehicle can be moved to the designated destination by means of automated driving. In particular, in a case where a distant destination is indicated, the accuracy of the indication can be improved by setting an object target near the indication as the destination. Also, by estimating the depth from the image, the three-dimensional position of the destination can be identified from the image.

Also, the invention is not limited to the foregoing embodiments, and various variations/changes are possible within the spirit of the invention.

For example, when the operator designates a destination, information regarding an object target serving as the destination (for example, the type, color, and the like of the object target) may be provided by sound or character input together with an indication. In this case, by estimating the object target indicated by the operator according to the present invention and estimating the object target using the information regarding the object target provided by the operator, it is possible to further improve the accuracy of the identification of the object target. In this case, a microphone that detects a sound is further provided as the external sensor 7, and information regarding the object target serving as the destination is provided on the basis of a sound signal input from the microphone. Alternatively, the information may be provided via a touch panel or the like of the HMI device 13.

The information regarding the object target may be, for example, information indicating the position and direction, the type, color, size, and the like of the object target, or a combination thereof. For example, while the depth direction of the arm is estimated from the direction of the face of the operator in the above embodiment, words such as "front" and "rear" may be recognized, and the determination may be made on the basis of the recognized information. Alternatively, while a target closest to the indication line 314 is identified as the destination position from among the targets identified from the image in the above embodiment, words such as "that red signboard" and "the blue vending machine" may be recognized, and the object target may be identified on the basis of the recognized information as well. Of course, this is merely an example, and information regarding the object target may be provided in other manners.

In the above embodiment, the vehicle has been described as an example, but the present invention is applicable not only to the vehicle but also to another mobile object capable of autonomous movement. The mobile object is not limited to a vehicle, and may include a compact mobility vehicle that travels in parallel with a walking user to carry baggage or that leads a person, or may include another mobile object (for example, a walking robot or the like) capable of autonomous movement.

SUMMARY OF EMBODIMENTS

The above-described present embodiments are summarized as follows.

According to the first aspect pf the invention, provided is a positioning system comprising:
at least one processor;
at least one memory that stores at least one program; and
a camera that captures an image,
wherein the at least one program causes the at least one processor to perform
identifying a destination position that is a three-dimensional position of a destination on a basis of the image,
wherein the three-dimensional position is a position in a three-dimensional space with reference to a position and an image capturing direction of the camera, and
wherein the identifying includes
identifying a person from the image, and estimating three-dimensional positions of two key points of the person after the person is identified,
in a case where an intersection between a line connecting the two key points and a ground is within a predetermined range from the person, identifying the intersection as the destination position, and
in a case where the intersection between the line connecting the two key points and the ground is not within the predetermined range from the person, identifying, as the destination position, a position of an object target existing within a predetermined distance from the line, from among object targets identified from the image.

With this configuration, a distant destination can be set with high accuracy.

According to the second aspect pf the invention, provided is the positioning system according to the above embodiment,
wherein the identifying includes, in a case where the intersection between the line connecting the two key points and the ground is not within the predetermined range from the person, identifying, as the destination position, a position of an object target closest to the line, from among the object targets identified from the image.

With this configuration, a distant destination can be set with high accuracy.

According to the third aspect pf the invention, provided is the positioning system according to the above embodiment,
wherein the identifying includes estimating three-dimensional positions of an eye and a wrist of the person as the two key points.

With this configuration, a destination can be set by a gesture using a person's eye and wrist.

According to the fourth aspect pf the invention, provided is the positioning system according to the above embodiment,
wherein the identifying includes, after the person is identified from the image, estimating a three-dimensional position of a foot of the person on a basis of a position of the foot in the image, and estimating the three-dimensional positions of the eye and the wrist on a basis of the three-dimensional position of the foot.

With this configuration, the position of a person in the depth direction can be identified from an image.

According to the fifth aspect pf the invention, provided is the positioning system according to the above embodiment,
wherein the identifying includes
estimating a distance from the camera to the foot on a basis of an image height of the foot in the image, and estimating the three-dimensional position of the eye regarding the estimated distance as a distance from the camera to the eye, and
estimating the three-dimensional position of the wrist on a basis of a position of the wrist in the image, an arm length based on an estimated body height of the person, and an apparent arm length in the image.

With this configuration, the position of the wrist in the depth direction can quickly and easily be identified from a person in an image.

According to the sixth aspect pf the invention, provided is the positioning system according to the above embodiment,
wherein the identifying includes
estimating a distance from the camera to the foot on a basis of an image height of the foot in the image, and estimating the three-dimensional position of the eye regarding the estimated distance as a distance from the camera to the eye, and
estimating the three-dimensional position of the wrist by shifting a position of the wrist in the image to a position corresponding to an arm length based on an estimated body height of the person along the image capturing direction.

With this configuration, the position of the wrist in the depth direction can accurately be identified from a person in an image.

According to the seventh aspect pf the invention, provided is the positioning system according to the above embodiment.
wherein the identifying includes estimating the position of the wrist in the image capturing direction in accordance with a face direction of the person.

With this configuration, the direction indicated by an operator can be identified in accordance with the intention of the operator.

According to the eighth aspect pf the invention, provided is the positioning system according to the above embodiment,
wherein the at least one program further causes the at least one processor to receive an input, and
wherein the specifying includes estimating the position of the wrist in the image capturing direction in accordance with the input.

With this configuration, the direction indicated by an operator can be identified in accordance with the intention of the operator.

According to the ninth aspect pf the invention, provided is the positioning system according to the above embodiment,
wherein the at least one program causes the at least one processor to receive an input, and
wherein the specifying includes identifying on a basis of the input, as the destination position, a predetermined object target from among the object targets identified from the image.

With this configuration, a destination position can be identified in accordance with the intention of an operator or the like.

According to the tenth aspect pf the invention, provided is the positioning system according to the above embodiment,
- wherein the object target is an object target within a range of a predetermined distance from the camera.

With this configuration, it is possible to prevent a distant destination from being set incorrectly.

According to the eleventh aspect pf the invention, provided is a mobile object comprising a positioning system, wherein the positioning system includes
- at least one processor,
- at least one memory that stores at least one program, and
- a camera that captures an image,
- wherein the at least one program causes the at least one processor to perform
- identifying a destination position that is a three-dimensional position of a destination on a basis of the image,
- wherein the three-dimensional position is a position in a three-dimensional space with reference to a position and an image capturing direction of the camera, and
- wherein the identifying includes
  - identifying a person from the image, and estimating three-dimensional positions of two key points of the person after the person is identified,
  - in a case where an intersection between a line connecting the two key points and a ground is within a predetermined range from the person, identifying the intersection as the destination position, and
  - in a case where the intersection between the line connecting the two key points and the ground is not within the predetermined range from the person, identifying, as the destination position, a position of an object target existing within a predetermined distance from the line, from among object targets identified from the image.

With this configuration, the destination of a vehicle can be set by a gesture.

According to the twelfth aspect pf the invention, provided is the mobile object according to claim 11, wherein the destination is set by the positioning system, and the mobile object travels to the destination by means of automated driving.

With this configuration, the destination of a vehicle can be set by a gesture, and the vehicle can be moved by means of automated driving.

The invention is not limited to the foregoing embodiments, and various variations/changes are possible within the spirit of the invention.

What is claimed is:

1. A positioning system for guiding a vehicle to a destination, comprising:
   - at least one processor;
   - at least one memory that stores at least one program; and
   - a camera that is fixed to the vehicle and captures an image outside the vehicle,
   - wherein the at least one program causes the at least one processor to perform
   - identifying a destination position that is a three-dimensional position of a destination on a basis of the image,
   - wherein the three-dimensional position is a position in a three-dimensional space with reference to a position and an image capturing direction of the camera, and
   - wherein the identifying includes
     - identifying a person from the image, and estimating three-dimensional positions of two key points of the person after the person is identified, and
     - setting the identified destination position as a destination of route guidance by the positioning system,
   - wherein
     - in a case where an intersection between a line connecting the two key points and a ground is within a predetermined range from the person, the identifying identifies the intersection as the destination position,
     - in a case where the intersection between the line connecting the two key points and the ground is not within the predetermined range from the person, the identifying identifies, as the destination position, a position of an object target existing within a predetermined distance from the line, from among object targets identified from the image, and
   - wherein the identifying includes, after the person is identified from the image, estimating a three-dimensional position of a foot of the person on a basis of a position of the foot in the image, and estimating a three-dimensional position of an eye and a three-dimensional position of a wrist of the person as the two key points on a basis of the three-dimensional position of the foot.

2. The positioning system according to claim 1, wherein where the predetermined distance from the line is the object target closest to the line.

3. The positioning system according to claim 2, wherein the at least one program causes the at least one processor to receive an input, and
   wherein the identifying includes identifying on a basis of the input, as the destination position, a predetermined object target from among the object targets identified from the image.

4. The positioning system according to claim 2, wherein the object target is an object target within a range of a predetermined distance from the camera.

5. The positioning system according to claim 1, wherein the identifying includes
   estimating a distance from the camera to the foot on a basis of an image height of the foot in the image, and estimating the three-dimensional position of the eye regarding the estimated distance as a distance from the camera to the eye, and
   estimating the three-dimensional position of the wrist on a basis of a position of the wrist in the image, an arm length based on an estimated body height of the person, and an apparent arm length in the image.

6. The positioning system according to claim 5, wherein the identifying includes estimating the position of the wrist in the image capturing direction in accordance with a face direction of the person.

7. The positioning system according to claim 5, wherein the at least one program further causes the at least one processor to receive an input, and
   wherein the identifying includes estimating the position of the wrist in the image capturing direction in accordance with the input.

8. The positioning system according to claim 5, wherein the at least one program causes the at least one processor to receive an input, and
   wherein the identifying includes identifying on a basis of the input, as the destination position, a predetermined object target from among the object targets identified from the image.

9. The positioning system according to claim 1, wherein the identifying includes estimating a distance from the camera to the foot on a basis of an image height of the foot in the image, and estimating the three-dimensional position of the eye regarding the estimated distance as a distance from the camera to the eye, and estimating the three-dimensional position of the wrist by shifting a position of the wrist in the image to a position corresponding to an arm length based on an estimated body height of the person along the image capturing direction.

10. The positioning system according to claim 9, wherein the identifying includes estimating the position of the wrist in the image capturing direction in accordance with a face direction of the person.

11. The positioning system according to claim 9, wherein the at least one program further causes the at least one processor to receive an input, and wherein the identifying includes estimating the position of the wrist in the image capturing direction in accordance with the input.

12. The positioning system according to claim 1, wherein the at least one program causes the at least one processor to receive an input, and wherein the identifying includes identifying on a basis of the input, as the destination position, a predetermined object target from among the object targets identified from the image.

13. The positioning system according to claim 1, wherein the object target is an object target within a range of a predetermined distance from the camera.

14. The positioning system according to claim 1, wherein the at least one program causes the at least one processor to perform outputting information indicating that setting of the destination of route guidance is failed in a case where the identifying the object target is failed.

15. The positioning system according to claim 1, wherein the at least one program causes the at least one processor to perform outputting information indicating that setting of the destination of route guidance is failed in a case where the destination is not set even after a time limit has elapsed.

16. The positioning system according to claim 1, wherein the camera captures a moving image composed of a plurality of frames, the plurality of frames include a target image to be processed and a stored image, and wherein the at least one program causes the at least one processor to perform deriving misalignment amount in terms of the person included in the target image to be processed and the stored image, and determining whether a posture of the person is stable.

17. The positioning system according to claim 16, wherein the determining determines that the posture of the person is stable in a case where a ratio of an area of the person included in the target image to an area of a person obtained by combining persons included in the target image and the stored image is within a predetermined value.

18. The positioning system according to claim 16, wherein in a case where the posture of the person is determined not to be stable, the target image is stored, standby is performed for a predetermined time, and the identifying is repeatedly tried.

19. A vehicle comprising a positioning system for guiding the vehicle to a destination, wherein the positioning system includes at least one processor, at least one memory that stores at least one program, and a camera that is fixed to the vehicle and captures an image outside the vehicle, wherein the at least one program causes the at least one processor to perform identifying a destination position that is a three-dimensional position of a destination on a basis of the image, wherein the three-dimensional position is a position in a three-dimensional space with reference to a position and an image capturing direction of the camera, and wherein the identifying includes identifying a person from the image, and estimating three-dimensional positions of two key points of the person after the person is identified, and setting the identified destination position as a destination of route guidance by the positioning system, wherein in a case where an intersection between a line connecting the two key points and a ground is within a predetermined range from the person, the identifying identifies the intersection as the destination position, and in a case where the intersection between the line connecting the two key points and the ground is not within the predetermined range from the person, the identifying identifies, as the destination position, a position of an object target existing within a predetermined distance from the line, from among object targets identified from the image, wherein the identifying includes, after the person is identified from the image, estimating a three-dimensional position of a foot of the person on a basis of a position of the foot in the image, and estimating a three-dimensional position of an eye and a three-dimensional position of a wrist of the person as the two key points on a basis of the three-dimensional position of the foot, and wherein the vehicle travels to the destination of route guidance by means of automated driving.

* * * * *